United States Patent [19]
Koyanagi et al.

[11] 3,952,944
[45] Apr. 27, 1976

[54] DEVICE FOR AUTOMATICALLY MONITORING THE OPERATING STATES OF CONTROLLED OBJECTS IN A SEQUENCE CONTROL SYSTEM

[75] Inventors: Haruo Koyanagi, Musashimurayama; Iwao Sato, Komae; Buhei Yasuhara; Jiro Sakai, both of Tokyo; Nobuharu Yamauchi, Amagasaki; Masaji Matsumura, Amagasaki; Katsuhide Morimoto, Amagasaki, all of Japan

[73] Assignees: Mitsubishi Denki Kabushiki Kaisha, Tokyo; Nissan Motor Company Limited, both of Japan

[22] Filed: May 21, 1974

[21] Appl. No.: 471,983

[30] Foreign Application Priority Data
May 22, 1973 Japan.............................. 48-57453

[52] U.S. Cl....................... 235/92 CT; 235/92 QC; 235/92 CA; 235/92 PD; 235/92 R; 340/248 R; 340/213 Q
[51] Int. Cl.²..................................... H03K 21/06

[58] Field of Search...... 235/92 QC, 92 CT, 92 CA, 235/92 PD, 92 MT, 92 T; 340/223, 248 R, 213 Q

[56] References Cited
UNITED STATES PATENTS

| | | | |
|---|---|---|---|
| 3,086,708 | 4/1963 | Berkowitz et al. | 235/92 CA |
| 3,500,024 | 3/1970 | Stacy et al. | 235/92 DE |
| 3,581,068 | 5/1971 | Wyatt | 328/44 |
| 3,674,991 | 7/1972 | Isvetkov | 235/92 PD |

*Primary Examiner*—Gareth D. Shaw
*Assistant Examiner*—John P. Vandenburg
*Attorney, Agent, or Firm*—Oblon, Fisher, Spivak, McClelland & Maier

[57] ABSTRACT

A sequence control monitoring device is disclosed which receives from controlled-objects operated under a sequence control system signals independently representing the operating states of the individual controlled-objects. The monitoring device counts the time duration for which each input signal remains in its on or off state, compares the counted value with a preset value, and thus judges whether the operating state of the controlled-object is correct.

1 Claim, 3 Drawing Figures

DEVICE FOR AUTOMATICALLY MONITORING THE OPERATING STATES OF CONTROLLED OBJECTS IN A SEQUENCE CONTROL SYSTEM

BACKGROUND OF THE INVENTION

1. Field of the Invention:

The present invention relates to a sequence control monitoring device capable of automatically monitoring the operating states of controlled-objects in a sequence control system.

2. Description of the Prior Art:

A sequence control system often involves maintenance problems, For instance, in the event of failure of a controlled-object, such as a limit switch or solenoid valve, maintenance personnel have had to visually or manually detect the location of the failure, relying heavily on their skill and experience. In practice, the point of failure cannot always be detected with ease, depending upon the skill and experience of maintenance people, as well as upon the location at which the controlled-object is installed. A need therefore exists for an automatic monitoring system for detecting such failures rapidly and accurately.

SUMMARY OF THE INVENTION

Accordingly, one object of the present invention is to provide a sequence control monitoring device capable of automatically monitoring the operating state of a plurality of controlled-objects.

Another object of the invention is to provide a sequence control monitoring device which counts the number of pulses generated for the period of an on or off state of an independent input signal representing the on or off state of each controlled-object, compares the counted value with a preset value, and judges, according to the compared result, whether the operating state of the controlled object is correct.

Still another object of the invention is to provide a sequence control monitoring device in which a reference set value is used, and the value of the number of pulses generated for the period of an on or off state of an independent input signal representing the on or off state of each controlled object is compared with the reference set value, a correction value which depends on the characteristic of the controlled-object is included in the reference set value, and thus the variation in the operating time of the controlled-object and the quantization error ascribable to counting of the on or off state by clock pulses are compensated.

Still another object of the invention is to provide a sequence control monitoring device which counts the number of pulses generated for the period of an on or off state of an independent input signal representing the on or off state of each controlled-object and of an inverted input signal thereof, and compares the counted value with a preset value.

Still another object of the invention is to provide a sequence control monitoring device which subtracts from a preset value the number of pulses counted for the period of an on or off state of an independent input signal representing the on or off state of each controlled-object, and thus compares the two values with each other.

A further object of the invention is to provide a sequence control monitoring device which counts the number of pulses generated for the period of an on or off state of an input signal representing the on or off state of each controlled-object, compares the counted value with a preset value, and judges the operating state of each controlled-object according to the compared result, and thereby actuates an alarm device.

These and other objects of the present invention are achieved by the apparatus of the present invention which is described in detail below, and which is illustrated in the accompanying drawings.

BRIEF DESCRIPTION OF THE DRAWINGS

A more complete appreciation of the invention and many of the attendant advantages thereof will be readily obtained as the same becomes better understood from the following detailed description when considered in connection with the accompanying drawings, wherein.

DESCRIPTION OF THE PREFERRED EMBODIMENT

Figure 1:
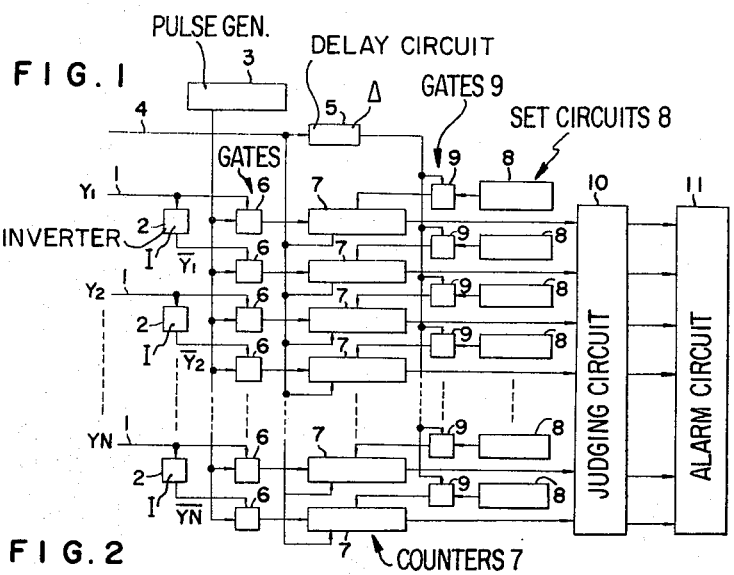
FIG. 1 is a block diagram showing a preferred embodiment of the invention.

Referring now to the drawings, wherein like reference numerals designate identical or corresponding parts throughout the several views, and more particularly to FIG. 1 thereof, a preferred embodiment of the present invention is illustrated in block diagram form. In FIG. 1 the numeral 1 denotes an input signal line for carrying an on or off state signal (i.e., make or break state signal) for a controlled object such as a limit switch or solenoid valve. The number of input signal lines is equal to the number of controlled objects. In the illustrated embodiment, the number of input signal points is N (N is a positive integer), and the individual input signals are indicated by $Y_1, Y_2, \ldots, Y_N$.

The numeral 2 denotes a sign inverter circuit which inverts an input signal from an on state to an off state or vice versa. The number of inverter circuits used is equal to the number of input signal points. In the illustrated embodiment, when an applied input signal is $Y_i$ (i is a positive integer), the output of the inverter circuit 2 is expressed as $\overline{Y_i}$.

The numeral 3 indicates a pulse generator circuit which always generates a pulse train at a constant frequency, while the numeral 4 indicates a start signal line for carrying a start signal generated at the start of one operation cycle of a controlled-object. Similarly, the numeral 5 designates a delay circuit which delays the start signal. The time delay of this delay circuit is selected to be suitably shorter than the period of the pulse train generated by the pulse generator 3.

The numeral 6 denotes a gate circuit which passes the pulses generated by the pulse generator 3 for the period its gate signal $Y_i$ or $\overline{Y_i}$ (i is a positive integer) is in the on-state. The numeral 7 denotes a counter circuit for substracting 1 from a preset value each time a clock pulse is supplied. This counter circuit is resettable to zero by an applied reset signal. A negative value reached as a result of the subtracting operation is expressed in terms of a complement.

The numeral 8 designates a set circuit for setting a positive number, and comprises registers or the like for storing data supplied from digital switches or a keyboard (not shown), while the numeral 9 designates a gate circuit which opens only when the value stored in the set circuit 8 is set into the counter circuit 7. Similarly, 10 refers to a judging circuit which compares the value counted by the counter circuit 7 with a predetermined judging standard, or preset value, and judges whether or not the duration of operation of a controlled-object is correct. In this embodiment, set values (positive numbers) corresponding to the individual input signals $Y_1, Y_2, \ldots, Y_N$ are set into the counter circuit 7 through the set circuit 8. The periods for which the input signals $Y_1, Y_2, \ldots, Y_N$ are in the on-state are counted (subtracted) in clock pulse time, and the transition from 0 to 1 of the sign bit of the counter circuit 7 (which transition occurs when the counted value becomes negative) is detected.

The numeral 11 indicates an alarm circuit which receives from the judging circuit 10 a judging signal for each controlled-object and generates an alarm concerning the controlled-object and its elements where an abnormal state is detected, (i.e., a state wherein the duration of operation does not meet the judging standard).

Figure 2:
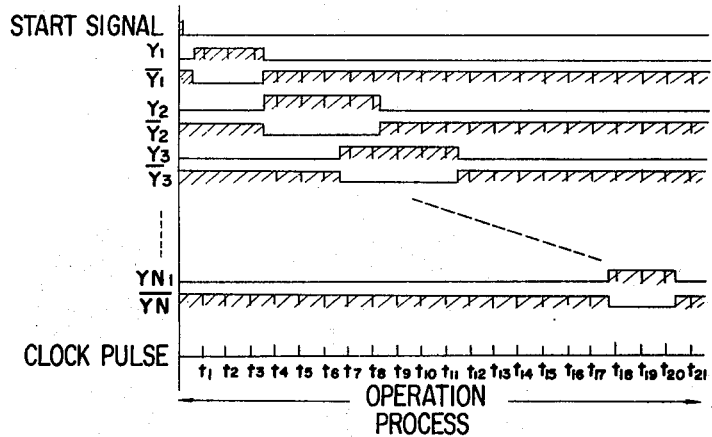
FIG. 2 is a timing diagram illustrating the operating sequence of the apparatus of FIG. 1; and, FIG. 3 is a timing diagram illustrating the operating sequence when a fault is detected.

FIG. 2 is a time chart illustrating the operation of the control sequence. An operation process starts with a start signal. First, the input signal $Y_1$ assumes an on-state. When the signal $Y_1$ ends and $Y_1$ assumes an off-state, the input signal $Y_2$ assumes an on-state. During the interval when $Y_2$ is in its on-state, the signal $Y_3$ assumes an on-state. In this manner, the signals $Y_4, Y_5, \ldots$, turn on in succession, and the operation process is completed when the signal $Y_N$ assumes an on-state. In FIG. 2, $\overline{Y}_1, \overline{Y}_2, \ldots, \overline{Y}_N$ are inverted signals $Y_1, Y_2, \ldots, Y_N$ respectively, and their on/off states are shown. (The on state is indicated by oblique lines.)

The operation of the sequence control monitoring device of the invention will now be described in greater detail by referring to FIGS. 1 and 2. In FIG. 1, when a start signal applied on line 4 is transmitted from a controlled-object, the counter circuit 7 is reset. The start signal on line 4 is subsequently delayed by the delay circuit 5. (The delay time is shorter than the period of the clock pulse.) Thus a set value (a positive number) is set into the counter circuit 7 from the set circuit 8 through the gate circuit 9. This set value in the present example is as follows:

3 + α for $Y_1$; if α = 2, it is 5.
18 + α for $Y_1$; if α = 2, it is 20.
5 + α for $Y_2$; if α = 2, it is 7.
16 + α for $Y_2$; if α = 2, it is 18.
5 + α for $Y_3$; if α = 2, it is 7.
16 + α for $Y_3$; if α = 2, it is 18.
3 + α for $Y_N$; if α = 2, it is 5.
18 + α for $Y_N$; if α = 2, it is 20. where α is a correction value determined according to the characteristic of the controlled-object in order to compensate for the quantization error attendant on counting by clock pulse and for the variation in the operation time of $Y_1, Y_2, \ldots, Y_N$. In this embodiment, α is determined to be 2.

When the input signal $Y_1$ assumes an on-state, the gate of the gate circuit corresponding to $Y_1$ opens to allow clock pulses $t_1, t_2, \ldots$ from the pulse generator circuit 3 to pass the gate. Each time a clock pulse comes into the counter circuit 7, 1 is subtracted from the value counted by the counter circuit 7 corresponding to $Y_1$. At the time when the clock pulse $t_1$ is supplied, the counter circuit 7 counts the following values:
4 in the counter circuit corresponding to $Y_1$
20 in the counter circuit corresponding to $Y_1$
7 in the counter circuit corresponding to $Y_2$
17 in the counter circuit corresponding to $Y_2$
7 in the counter circuit corresponding to $Y_3$
17 in the counter circuit corresponding to $Y_3$
5 in the counter circuit corresponding to $Y_N$
19 in the counter circuit corresponding to $Y_N$. Similarly, at the time when one operation process of the controlled-object is completed, the counter circuit 7 counts the following values:
2 in the counter circuit corresponding to $Y_1$
2 in the counter circuit corresponding to $Y_1$
2 in the counter circuit corresponding to $Y_2$
2 in the counter circuit corresponding to $Y_2$
2 in the counter circuit corresponding to $Y_3$
2 in the counter circuit corresponding to $Y_3$
2 in the counter circuit corresponding to $Y_N$
2 in the counter circuit corresponding to $Y_N$.
As shown above, the counter circuit 7 indicates all positive values.

Assume that an abnormality occurs with $Y_3$ of the controlled-object such that $Y_3$ remains in the on-state and does not switch to the off-state. Then the device of this invention operates in the following manner.

Figure 3:
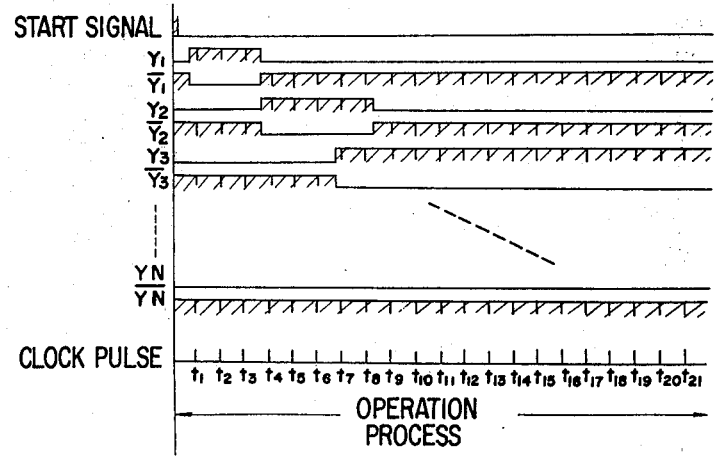

In FIG. 3, assume that normal operation is maintained until the time $t_{11}$ and that $Y_3$ does not turn to the off-state even at times after $t_{12}, t_{13}, \ldots$ In this situation, the values counted by the counter circuit 7 after the clock pulse $t_{14}$ are as follows:
2 in the counter circuit corresponding to $Y_1$
9 in the counter circuit corresponding to $y_1$
2 in the counter circuit corresponding to $Y_2$
9 in the counter circuit corresponding to $Y_2$
−1 in the counter circuit corresponding to $Y_3$
12 in the counter circuit corresponding to $Y_3$
5 in the counter circuit corresponding to $Y_N$
6 in the counter circuit corresponding to $Y_N$
At this time, the value counted by the counter circuit 7 turns into a negative value, which is detected by the judging circuit 10 to actuate the alarm circuit 11. The alarm circuit 11 thereby generates an alarm for Y.

If the counter circuit 7 continues to count after the clock pulse $t_{21}$, the values counted after the lapse of time corresponding to the period needed to complete one operation process are as follows: (Note: In this example, assume that $Y_4, Y_5, \ldots, Y_N$ are inoperative because $Y_3$ does not complete its operation and does not switch to the off state.)
2 in the counter circuit corresponding to $Y_1$
2 in the counter circuit corresponding to $Y_1$
2 in the counter circuit corresponding to $Y_2$
2 in the counter circuit corresponding to $Y_2$
−8 in the counter circuit corresponding to $Y_3$
12 in the counter circuit corresponding to $Y_3$
5 in the counter circuit corresponding to $Y_N$
−1 in the counter circuit corresponding to $Y_N$
According to the invention, as has been described, it is detected that the input signal corresponding to $Y_i$ remains in the on-state and does not switch to the off-state after passage of a given time whenever the value counted in the counter circuit 7 corresponding to $Y_i$ becomes negative. Similarly, it is detected that the input signal corresponding to $Y_i$ remains in the off-state and does not switch to the on-state after passage of a given time whenever the value counted in the counter circuit 7 corresponding to $Y_i$ becomes negative.

While the principles of the invention have been described above in connection with a specific embodiment, it is to be clearly understood that this description is made only by way of example and not as a limitation on the scope of the invention.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A sequence control monitoring system for monitoring the operating states of first and second controlled objects comprising:

a pulse generator for generating a series of pulses at a predetermined frequency, a delay circuit having a delay time shorter than one period of the predetermined frequency, a first inverter, a second inverter, a first gate, a second gate, a third gate, a fourth gate, a fifth gate, a sixth gate, a seventh gate, an eighth gate, a first counter circuit comprising a first input for resetting the counter circuit, a second input for setting the counter circuit to the number of pulses to be received from the pulse generator representative of the on time of the first controlled object if operation of the first controlled object is without error, a third input for receiving pulses from the pulse generator representative of the actual on time of the first controlled object and an output for generating a signal representative of the pulses to be received if operation is without error less the pulses actually received, a second counter circuit comprising a first input for resetting the counter circuit, a second input for setting the counter circuit to the number of pulses to be received from the pulse generator representative of the off time of the first controlled object if operation of the first controlled object is without error, a third input for receiving pulses from the pulse generator representative of the actual off time of the first controlled object and an output for generating a signal representative of the pulses to be received if operation is without error less the pulses actually received, a third counter circuit comprising a first input for resetting the counter circuit, a second input for setting the counter circuit to the number of pulses to be received from the pulse generator representative of the on time of the second controlled object if operation of the second controlled object is without error, a third input for receiving pulses from the pulse generator representative of the actual on time of the second controlled object and an output for generating a signal representative of the pulses to be received if operation is without error less the pulses actually received, a fourth counter circuit comprising a first input for resetting the counter circuit, a second input for setting the counter circuit to the number of pulses to be received from the pulse generator representative of the off time of the second controlled object if operation of the second controlled object is without error, a third input for receiving pulses from the pulse generator representative of the actual off time of the second controlled object and an output for generating a signal representative of the pulses to be received if operation is without error less the pulses actually received, a first set circuit for generating the number of pulses to be received from the pulse generator representative of the on time of the first controlled object if operation of the first controlled object is without error, a second set circuit for generating the number of pulses to be received from the pulse generator representative of the off time of the first controlled object if operation of the first controlled object is without error, a third set circuit for generating the number of pulses to be received from the pulse generator representative of the on time of the second controlled object if operation of the second controlled object is without error, a fourth set circuit for generating the number of pulses to be received from the pulse generator representative of the off time of the second controlled object if operation of the second controlled object is without error, a judging circuit for receiving the output of the first counter circuit and for generating a signal if the output of the first counter circuit is negative, for receiving the output of the second counter circuit and for generating a signal if the output of the second counter circuit is negative, for receiving the output of the third counter circuit and for generating a signal if the output of the third counter circuit is negative and for receiving the output of the fourth counter circuit and for generating a signal if the output of the fourth counter circuit is negative, an alarm circuit for receiving the signal generated by the judging circuit, a start signal line for receiving a start signal connected to the input of the delay circuit, means connecting the output of the delay circuit to the first input of the fifth gate, to the first input of the sixth gate, to the first input of the seventh gate and to the first input of the eighth gate, an input signal line for receiving an input signal for the first controlled object connected to the input of the first inverter and to a first input of the first gate, a second input signal line for receiving an input signal for the second controlled object connected to the input of the second inverter and to a first input of the third gate, means connecting the output of the first inverter to a first input of the second gate, means connecting the output of the second inverter to a first input of the fourth gate, means connecting the output of the pulse generator to a second input of the first gate, a second input of the second gate, a second input of the third gate and a second input of the fourth gate, means connecting the start signal line to a first input of the first counter circuit, to a first input of the second counter circuit, to a first input of the third counter circuit and to a first input of the fourth counter circuit, means connecting the output of the first gate to a third input of the first counter circuit, means connecting the output of the second gate to a third input of the second counter circuit,
means connecting the output of the third gate to a third input of the third counter circuit,
means connecting the output of the fourth gate to a third input of the fourth counter circuit,
means connecting the output of the first set circuit to a second input of the fifth gate,
means connecting the output of the second set circuit to a second input of the sixth gate,
means connecting the output of the third set circuit to a second input of the seventh gate,
means connecting the output of the fourth set circuit to a second input of the eighth gate,
means connecting the output of the fifth gate to a second input of the first counter circuit,
means connecting the output of the sixth gate to a second input of the second counter circuit,
means connecting the output of the seventh gate to a second input of the third counter circuit,
means connecting the output of the eighth gate to a second input of the fourth counter circuit,
means connecting the output of the first counter circuit to the judging circuit,
means connecting the output of the second counter circuit to the judging circuit,
means connecting the output of the third counter circuit to the judging circuit,
means connecting the output of the fourth counter circuit to the judging circuit,
means connecting a first output of the judging circuit to a first input of the alarm circuit,
means connecting a second output of the judging circuit to a second input of the alarm circuit,
means connecting a third output of the judging circuit to a third input of the alarm circuit,
means connecting a fourth output of the judging circuit to a fourth input of the alarm circuit.

* * * * *